D. DULL.
NUT-LOCK.

No. 176,429.        Patented April 25, 1876.

Witnesses          Inventor

UNITED STATES PATENT OFFICE.

DANIEL DULL, OF ROUSEVILLE, PENNSYLVANIA.

IMPROVEMENT IN NUT-LOCKS.

Specification forming part of Letters Patent No. 176,429, dated April 25, 1876; application filed January 6, 1876.

*To all whom it may concern:*

Be it known that I, DANIEL DULL, of Rouseville, Venango county, Pennsylvania, have invented a Device for Locking the Nuts on Fish-Plates on Railroad-Rails, of which the following is a specification:

The object of my invention is to secure the nuts of the bolts that bolt the fish-plates to the railroad-rails in such a manner that the jar of the rails caused by the cars passing over them will not loosen the nuts, and at the same time that when desired the nuts can be removed.

Figure 1:
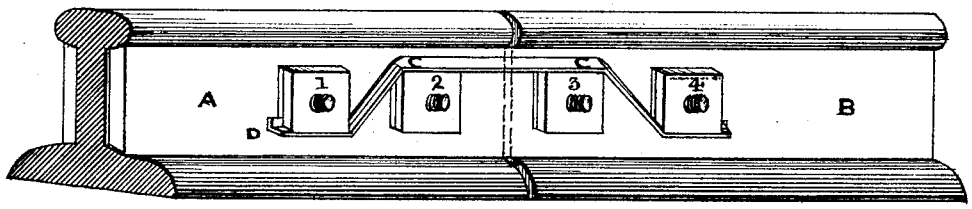
Figure 2:
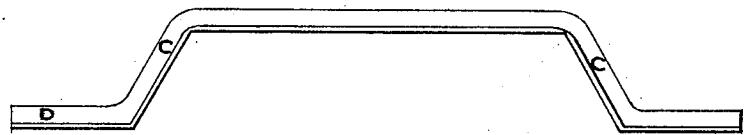

Figure 1 represents my device in place on the rail. Fig. 2 represents the same removed from the rail.

It is constructed as follows, to wit: The nuts 1 2 3 4 are turned on the bolts in the usual manner. Between the nuts and the rail is placed a thick washer less in size than the nuts. Fig. 2 represents a spring of steel so bent that it will pass over the nuts 2 and 3, and the ends under the nuts 1 and 4, as shown in Fig. 1. On the side of the spring D C C, next the rail, there is turned a flange, C C, at right angles to the body of the spring. When the spring D C C is in place the flange C C passes up behind the nuts, while the face of the spring rests on the edge of the nuts in the manner shown in Fig. 1.

When the spring is thus adjusted, as shown in the drawing, Fig. 1, it will be seen that the nuts cannot be turned until the spring is removed, which is done by bending the ends of the spring down until the flange is released from the nuts, when it can be easily removed.

What I claim as my invention is—

The spring D C C, constructed with the flange C C, to pass behind the nuts, in the manner described, for the purposes set forth.

DANIEL DULL.

Witnesses:
A. B. RICHMOND,
L. L. RICHMOND.